US008048555B2

(12) United States Patent
Darcy et al.

(10) Patent No.: US 8,048,555 B2
(45) Date of Patent: Nov. 1, 2011

(54) FLOWING ELECTROLYTE BATTERY WITH ELECTRIC POTENTIAL NEUTRALIZATION

(75) Inventors: Dennis Darcy, Tyugsboro, MA (US); Gary Colello, North Andover, MA (US)

(73) Assignee: Premium Power Corporation, North Reading, MA (US)

( * ) Notice: Subject to any disclaimer, the term of this patent is extended or adjusted under 35 U.S.C. 154(b) by 1541 days.

(21) Appl. No.: 11/342,476

(22) Filed: Jan. 30, 2006

(65) Prior Publication Data

US 2006/0251957 A1 Nov. 9, 2006

Related U.S. Application Data

(60) Provisional application No. 60/648,156, filed on Jan. 28, 2005.

(51) Int. Cl.
*H01M 6/00* (2006.01)
*H01M 10/00* (2006.01)

(52) U.S. Cl. ................................................ 429/122

(58) Field of Classification Search .................. None
See application file for complete search history.

(56) References Cited

U.S. PATENT DOCUMENTS

| | | | | |
|---|---|---|---|---|
| 4,069,371 A | * | 1/1978 | Zito | 429/21 |
| 4,321,312 A | * | 3/1982 | Fujii et al. | 429/12 |
| 4,663,251 A | * | 5/1987 | Sasaki et al. | 429/29 |
| 6,355,373 B1 | | 3/2002 | Pauling | |
| 2001/0055713 A1 | * | 12/2001 | Eidler et al. | 429/81 |

FOREIGN PATENT DOCUMENTS

| | | |
|---|---|---|
| JP | 03147278 | 6/1991 |
| WO | WO 2006/081514 A3 | 8/2006 |

OTHER PUBLICATIONS

International Search Report, Related Application Serial No. PCT/US2006/003124, Sep. 25, 2006.
Written Opinion, Related Application Serial No. PCT/US2006/003124, Sep. 25, 2006.
International Preliminary Report on Patentability, Related Application Serial No. PCT/US2006/003124, Jul. 31, 2007.
Preliminary Amendment, Related Application Serial No. EP 06719813.5, Oct. 16, 2007.
Abstract of JP 02065074; Toyota Motor Corp.; Mar. 5, 1990.
Office Action issued in related European Application 06719813.5 dated Feb. 20, 2009, 3 pages.
Response to Office Action issued in related European Application 06719813.5 dated Jun. 25, 2009, 20 pages.
Office Action issued in related Australian Application 2006207991 dated Jun. 11, 2009, 2 pages.
Office Action issued in related Chinese Application 200680003482.X dated Jun. 19, 2009, 17 pages.
Office Action issued in related Chinese Patent Application Serial No. 200680003482.X, dated Feb. 12, 2010, 14 pages.

* cited by examiner

*Primary Examiner* — Emily Le
*Assistant Examiner* — Michael Forrest
(74) *Attorney, Agent, or Firm* — Lathrop & Gage LLP

(57) ABSTRACT

Flowing electrolyte batteries capable of being selectively neutralized chemically; processes of selectively neutralizing flowing electrolyte batteries chemically; and processes of selectively restoring the electrical potential of flowing electrolyte batteries are disclosed herein.

10 Claims, 10 Drawing Sheets

FLOWING ELECTROLYTE BATTERY WITH ELECTRIC POTENTIAL NEUTRALIZATION

RELATED APPLICATIONS

The present application claims benefit of priority to provisional U.S. Patent Application No. 60/648,156, filed Jan. 28, 2005 and titled "Methods and Apparatus for Electric Potential Neutralization in a Flowing Electrolyte Battery", which is incorporated herein by reference.

BACKGROUND

Batteries are used for a wide variety of industrial applications. For example, buildings containing lead acid batteries are placed throughout our countryside and within our urban areas for electrical energy storage, and these batteries are used to keep telephones, cable TV, and Internet data centers functional when power is otherwise lost. The most widely used batteries for industrial applications are the classic lead acid battery, which are available as flooded cell or valve regulated. Each of these batteries uses the same basic chemistry; plates of lead and lead oxide are contained in an electrolyte of sulfuric acid. Battery terminals are connected to these plates immersed in electrolyte.

Flowing electrolyte batteries have two electrolytes, anolyte and catholyte, that are circulating and separated by a membrane. In the case of zinc bromine flowing electrolyte battery, zinc is plated out during charge and consequently frees up bromide ions that diffuse across the membrane. In this case, the anolyte becomes increasingly zinc depleted and the catholyte becomes increasingly bromine rich. An electrical potential develops across this membrane due to the presence of metal on one side of the membrane, such as zinc, and a catholyte on the other side of the membrane. The catholyte is rich in cation concentration such as bromide.

In the event of a fire within a facility containing industrial batteries, or in the event of a battery malfunction, the batteries may become unsafe and the energy that they store may become readily available to the outside world. Fire departments proceed with great caution into fires in such facilities because of the danger of electrical shock or explosion that may occur in the event of a battery failure. Previously, there has not been a way to turn batteries off chemically.

Also, in the event of non-use, a battery can self discharge due to reactant available in the reaction cell. The reactant causes a slow diffusion through the membrane to slowly discharge the battery. Previously, there has not been a way to neutralize batteries chemically to stop this self discharge in times of non-use.

SUMMARY

A battery in which electric potential is quickly neutralized chemically would increase safety in situations such as those described above and prevent self discharge in times of non-use. Accordingly, flowing electrolyte batteries capable of being selectively neutralized chemically and processes of selectively neutralizing a flowing electrolyte battery chemically are disclosed herein. A battery of one embodiment includes first and second electrodes separated by a membrane. One or more valves permit (1) flow of catholyte through the second electrode and anolyte through the first electrode such that the battery has electrical potential, or alternately (2) flow of anolyte through both first and second electrodes such that the battery is chemically neutralized.

In an embodiment, a flowing electrolyte battery having an electric potential that is selectively neutralized chemically is provided. The battery includes first and second electrodes separated by a membrane, an anolyte reservoir for housing an anolyte, and a catholyte reservoir for housing a catholyte. A first pump selectively forces the anolyte from the anolyte reservoir through the first electrode, and a second pump selectively forces the catholyte from the catholyte reservoir through the second electrode. Means are included for selectively forcing only anolyte from the anolyte reservoir through the second electrode.

In an embodiment, a process of selectively neutralizing a flowing electrolyte battery chemically is provided. The method includes the steps of (1) flowing anolyte and catholyte through electrodes of the electrolyte battery to produce electricity; (2) determining a neutralization event; and (3) flowing only anolyte through the electrodes to neutralize the battery's electric potential.

In an embodiment, a process of selectively restoring electrical potential of a flowing electrolyte battery is provided. The method includes the steps of (1) determining whether the battery should have electrical potential; (2) inhibiting flow of anolyte through one of the battery's electrodes; and (3) flowing anolyte and catholyte through the battery to produce electric potential.

In an embodiment, a flowing electrolyte battery having an electric potential that is selectively neutralized chemically is provided. The battery includes first and second electrodes separated by a membrane. One or more valves permit (1) flow of catholyte through the second electrode and anolyte through the first electrode such that the battery has electrical potential, or alternately (2) flow of anolyte through both the first electrode and an electrically neutral fluid through the second electrode such that the battery is chemically neutralized.

In an embodiment, a flowing electrolyte battery having an electric potential that is selectively neutralized chemically is provided. The battery includes first and second electrodes separated by a membrane, an anolyte reservoir in communication with a first pump for housing anolyte and supplying the first pump with the anolyte, and a catholyte reservoir for housing catholyte and supplying the second pump with the catholyte. Piping is included for: connecting the anolyte reservoir to the first electrode such that the anolyte flows from the anolyte reservoir to the first electrode; connecting the first electrode to the anolyte reservoir such that the anolyte flows from the first electrode to the anolyte reservoir; connecting the catholyte reservoir to the second electrode such that the catholyte flows from the catholyte reservoir to the second electrode; and connecting the second electrode to the catholyte reservoir such that the catholyte flows from the second electrode to the catholyte reservoir. Means are included for selectively flowing the catholyte from the second electrode back to the second electrode without first entering the catholyte reservoir.

In an embodiment, a process of selectively neutralizing a flowing electrolyte battery chemically is provided. The method includes the steps of (1) flowing anolyte and catholyte through electrodes of the electrolyte battery to produce electricity; (2) determining a neutralization event; and (3) flowing only anolyte and electrically neutral fluid through the electrodes to neutralize the battery's electric potential.

In an embodiment, a process of selectively restoring electrical potential of a flowing electrolyte battery is provided. The method includes the steps of (1) determining whether the battery should have electrical potential; (2) inhibiting flow of electrically neutral fluid through one of the battery's electrodes; and (3) flowing anolyte and catholyte through the battery to produce electric potential.

DETAILED DESCRIPTION

Figure 1:
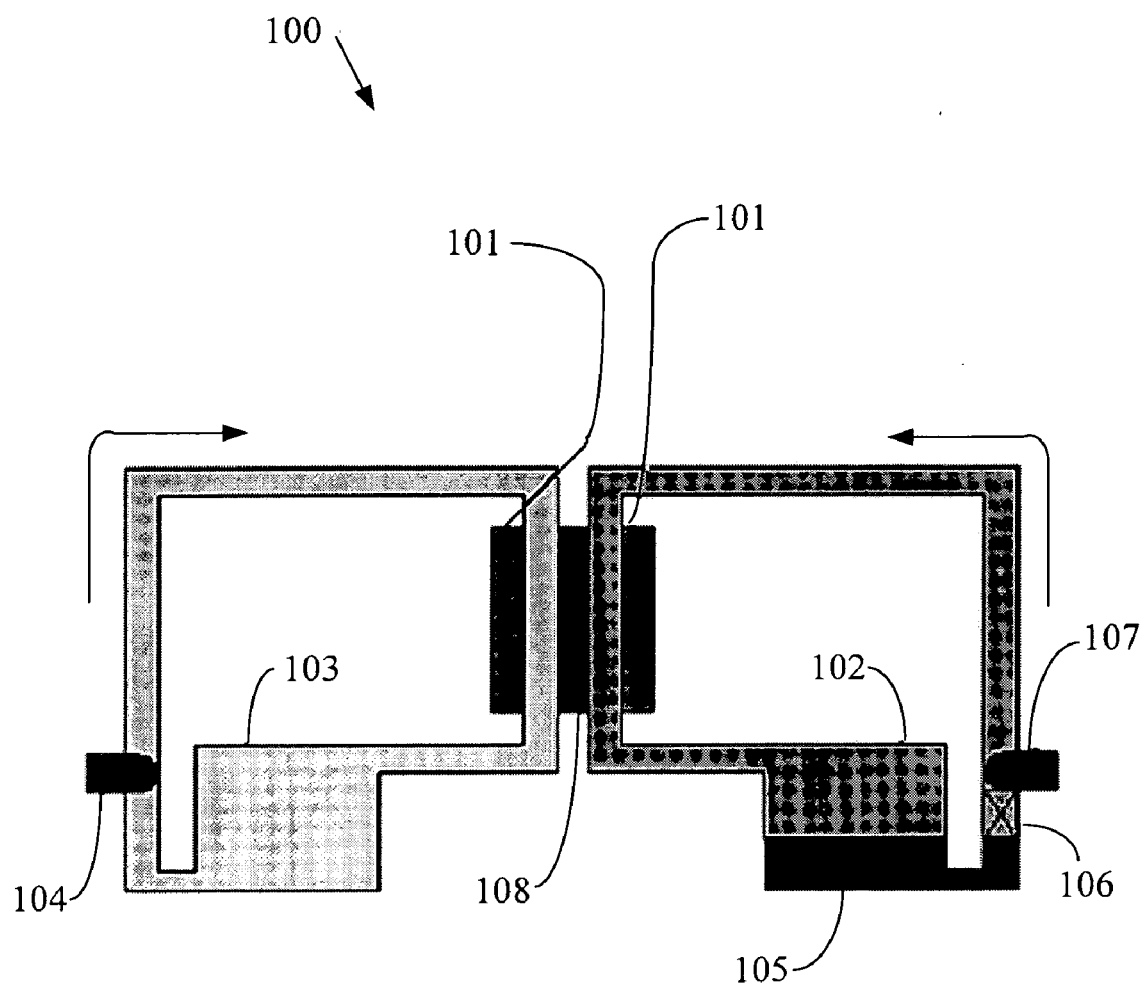
FIG. 1 schematically shows a prior art flowing electrolyte battery.

FIG. 1 shows a typical configuration for a flowing electrolyte battery 100. Battery 100 includes bipolar carbon electrodes 101 separated by a membrane 108 that is porous to cations, a catholyte tank 102, and an anolyte tank 103. A pump 104 circulates anolyte and a separate pump 107 circulates catholyte. A secondary catholyte 105 may also be included, which in the case of a zinc bromide flowing electrolyte battery 100 is a polybromide complex. A valve 106, e.g., a polybromide complex valve, allows pump 107 to pull polybromide complex 105 from a bottom of a tank during battery electrical discharge. Battery 100 provides potential energy across membrane 108 when catholyte and anolyte pass through electrodes 101 on respective sides of membrane 108.

Figure 2:
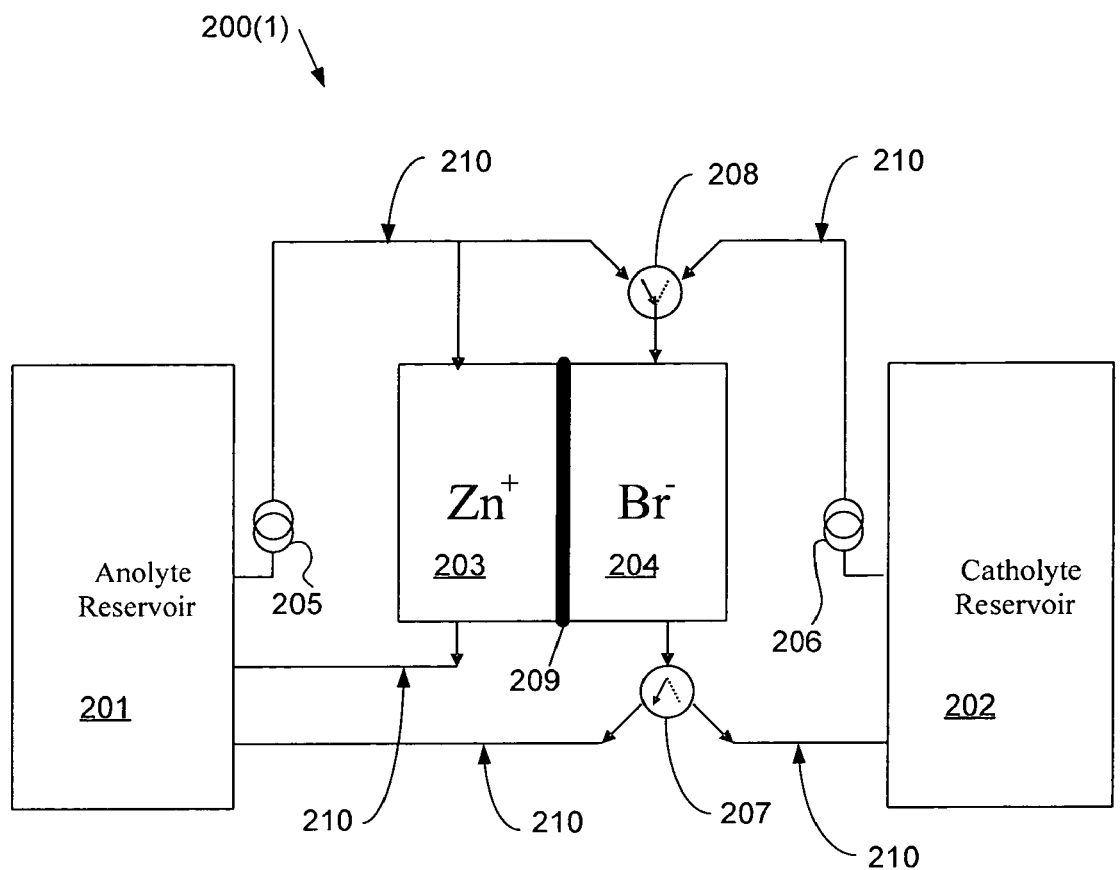
FIG. 2 schematically shows one flowing electrolyte battery with electric potential neutralization.

FIG. 2 shows a flowing electrolyte battery 200(1) capable of being turned off chemically, to provide electric potential neutralization. Battery 200(1) may be a zinc bromine flowing electrolyte battery or another flow-type battery. An anolyte electrolyte reservoir 201 is in fluid communication with an anolyte pump 205, and a catholyte reservoir 202 is in fluid communication with a catholyte pump 206. With pump 205 operating, anolyte flows through a carbon electrode 203, which is separated from a catholyte electrode 204 by a membrane 209. With pump 206 operating, anolyte or catholyte flows through catholyte electrode 204, as now described. Piping 210 is appropriately arranged to connect the various elements, such as shown in FIG. 2, for example. Two valves 208, 207 are positioned to direct flow of catholyte or anolyte through catholyte electrode 204.

In normal operation, valve 208 only allows catholyte from catholyte reservoir 202 through catholyte electrode 204, and valve 207 only allows electrolyte passing through catholyte electrode 204 to enter catholyte reservoir 202. In a neutralized mode, however, valve 208 only allows anolyte from anolyte reservoir 201 through catholyte electrode 204, and valve 207 only allows electrolyte passing through catholyte electrode 204 to enter anolyte reservoir 201. Battery 200(1) is thus neutralized ("turned off") chemically when in the neutralized mode. Valves 207 and 208 are shown in the neutralized mode in FIG. 2. Valves 207 and 208 may be made up of individual valves connected together to act in concert; valves 207 and 208 may be check valves or another type of valve.

Provided that there is no break in piping 210 and pumps 205, 206 are functional, the electric potential of battery 200 (1) returns when valves 207 and 208 are returned to the normal position (i.e., so that catholyte flows through electrode 204). In other words, the electrical potential of battery 200(1) may be brought to zero without removing the charge, and original electric potential may be restored with no appreciable loss of stored energy. This is notable because a battery is typically charged to a voltage and can only return to zero volts by fully discharging the battery's electric potential.

Figure 3:
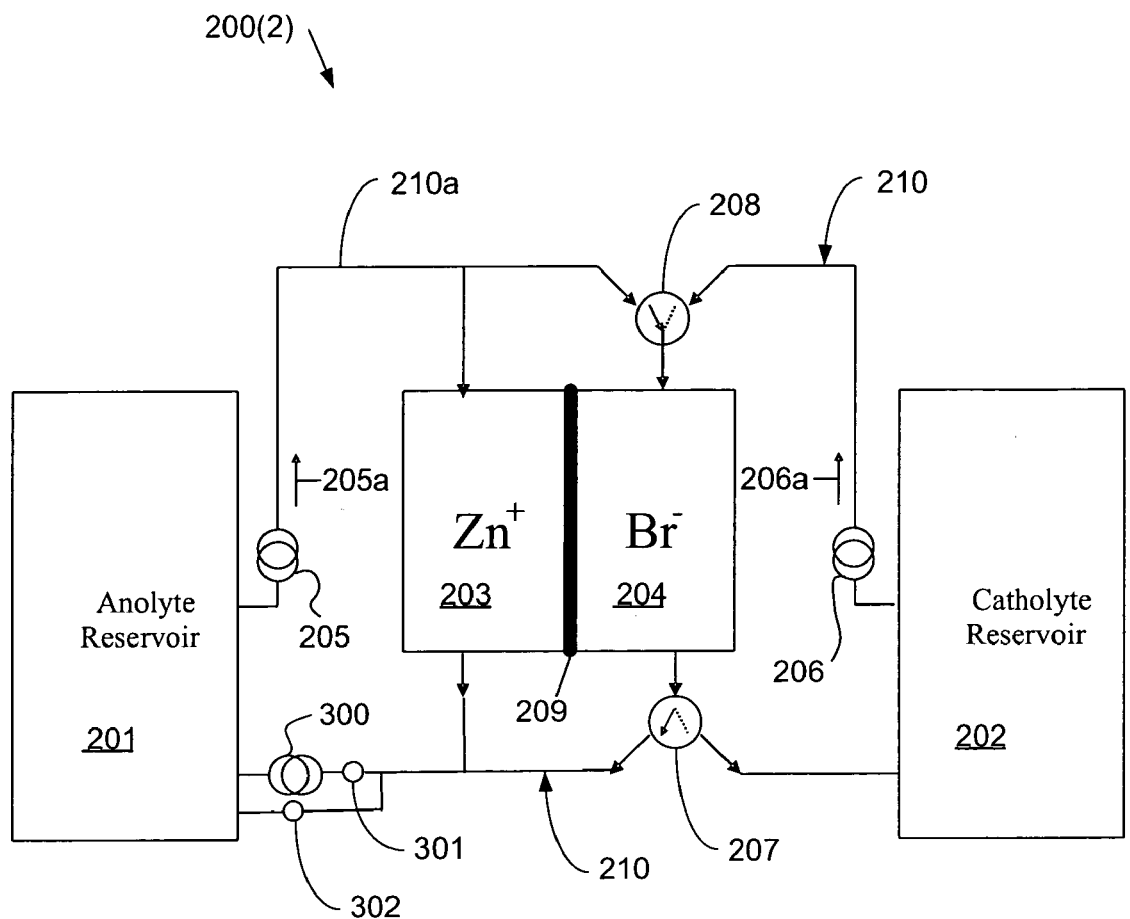
FIG. 3 schematically shows another flowing electrolyte battery with electric potential neutralization.

FIG. 3 shows a flowing electrolyte battery with electric potential neutralization 200(2) which includes an additional pump 300 and additional valves 301, 302 in parallel. Additional pump 300 may be used to drive electrolyte in a reverse direction (i.e., in a direction opposite arrows 205a, 206a shown in FIG. 3) through battery 200(2) in the event of a failure in a supply side 210a of piping 210. Normally, electrolyte may be pumped through pumps 205, 206 in the direction of arrows 205a, 206a, respectfully. In the event battery 200(2) is put into a neutralized mode, however, valves 207, 208 are configured such that anolyte (e.g., a zinc depleted electrolyte) may be pumped through both electrode 203 and electrode 204 and returned to anolyte reservoir 201 as described above.

Normally, valve 301 may be closed, and valve 302 may be open to allow anolyte to flow from electrode 203 (and sometimes from electrode 204 as described above) to anolyte reservoir 201. If pump 300 is an impeller driven pump rather than a positive displacement pump, valves 301, 302 may not be used because such a pump 300 allows anolyte to flow through pump 300 to anolyte reservoir 201.

If piping 210a supplying electrolyte from pump 205, pump 205, or another relevant element fails, making it difficult to displace the fluid in the catholyte side 204 of battery 200(2), pump 300 may be activated. Upon activation of pump 300, valve 401 may be opened to allow anolyte to flow from anolyte reservoir 201, valve 302 may be closed to prevent electrolyte from flowing around pump 300, and valves 207 and 208 may be configured to allow anolyte from anolyte reservoir 201 to flow through electrode 204. As a result, electrolyte may flow backwards (i.e., in a way opposite the arrows shown in FIG. 3) through battery 200(2).

Figure 4:
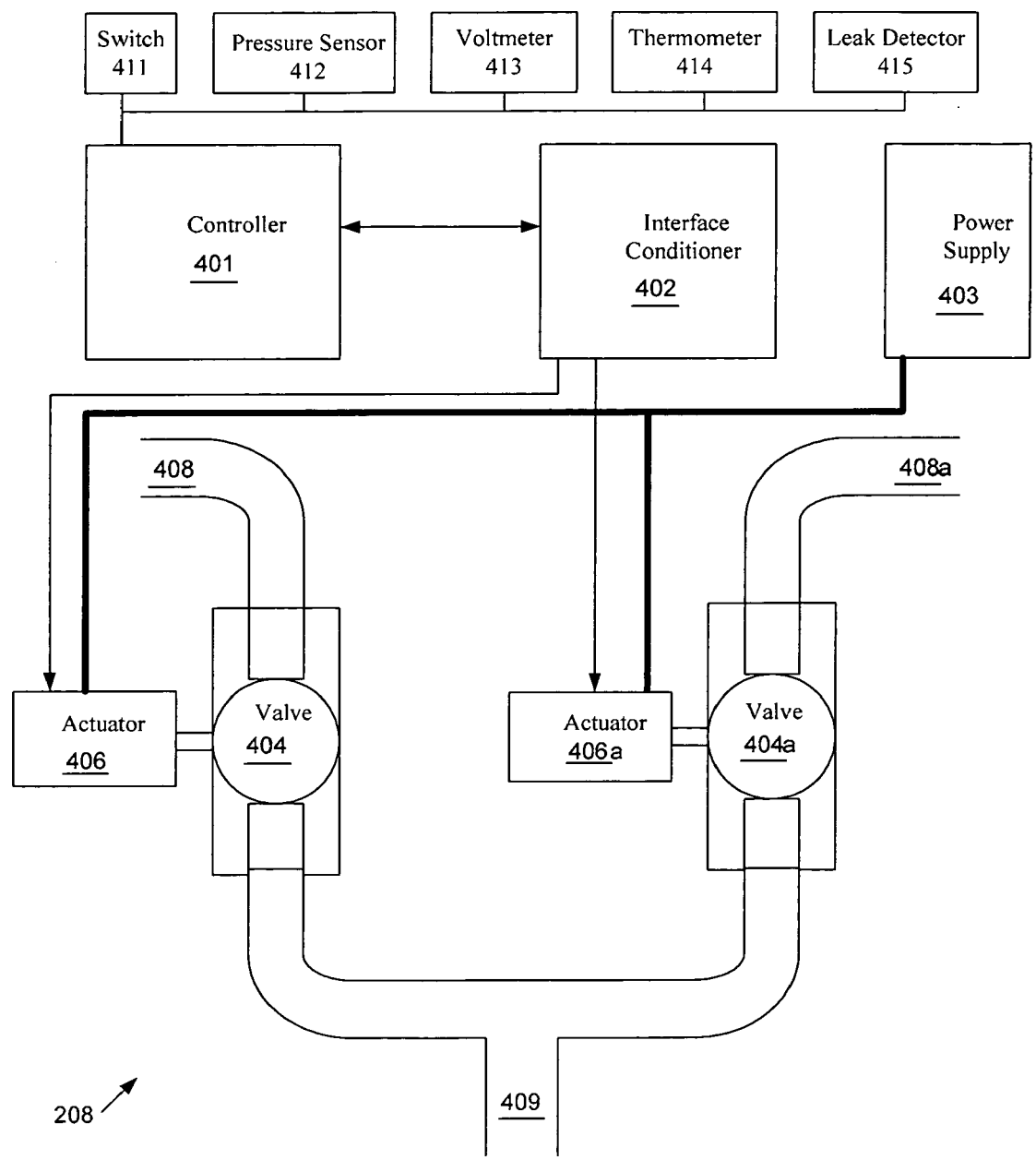
FIG. 4 schematically shows a valve according to an embodiment.

FIG. 4 shows an exemplary embodiment of valve 208. In this embodiment, valve 208 includes a controller 401, an interface conditioner 402, a power supply 403, first and second valves 404, 404a, and first and second valve actuators 406, 406a. Controller 401 may be, for example, a programmable logic array, a microcontroller or microprocessor, a switch, or a comparator having logic to look for an abnormal data signal (e.g., an abnormal pressure, voltage, or temperature data signal, or another signal indicating the presence of a leak); this abnormal data signal may thus trigger a neutralization event such as described hereinbelow. Controller 401 may be in data communication with a switch 411, a pressure sensor 412, a voltmeter 413, a thermometer 414, and/or a leak detector 415.

Interface conditioner 402 places controller 401 in data communication with first and second valve actuators 406, 406a, such as by supplying first and second valve actuators 406, 406a with appropriate voltage or current levels. Actuators 406, 406a communicate with valves 404, 404a, respectfully, to position valves 404, 404a in open or closed conditions in accordance with signals (e.g., particular voltages or currents) received from interface conditioner 402. Valves 404, 404a may be ball valves or valves of another type, and when one valve 404, 404a is open, the other valve 404, 404a is closed. Power supply 403 may supply power to any or all of controller 401, interface conditioner 402, first valve actuator 406, and second valve actuator 406a, for example.

Valves 404, 404a and actuators 406, 406a may be standard piping parts capable of being purchased out of a catalog. An exemplary actuator 406, 406a is Asahi America Series 83 Actuator Electromni, and an exemplary valve 404, 404a is a Type 21 ball valve. Valves 404, 404a may include a non-reactive plastic such as PVDF in the case bromine zinc reactants are used.

In an exemplary method of use, controller 401 sends first and second valve actuators 406, 406a a "normal" signal via interface conditioner 402 to cause valve 404a to be at an open configuration and valve 404 to be at a closed configuration. This allows the corresponding battery (e.g., battery 200(1), battery 200(2)) to function in a normal mode of operation; catholyte from catholyte reservoir 202 and pipe 408a thus flows through pipe 409 to electrode 204. When controller 401 detects a neutralization event (e.g., switch 411 being turned off, abnormal pressure, voltage, temperature, or another indication of a leak), controller 401 sends a "neutralize" signal via interface conditioner 402 to cause valve 404a to be at a closed configuration and valve 404 to be at an open configuration. This allows battery 200(1), 200(2) to be turned off chemically as discussed above; anolyte from anolyte reservoir 201 and pipe 408 thus flows out of pipe 409 to electrode 204. If controller 401 later sends another "normal" signal to cause valve 404a to be at the open configuration and valve 404 to be at the closed configuration, the electric potential of the battery is restored; that is, catholyte from catholyte reservoir 202 and pipe 408a again flows through pipe 409 to electrode 204.

Switch 411 may be turned off, for example, to prevent self discharge of battery 200(1), 200(2) in times of non-use. When battery 200(1), 200(2) is neutralized as discussed above, this self discharge is stopped because the reactants are removed and stored safely away from the reaction site. However, if switch 411 is turned off for this reason, the time required for restoring the electric potential of battery 200(1), 200(2) may be unacceptable if battery 200(1), 200(2) is being used as an uninterruptible (back-up) power supply. In this case, it may be desirable to neutralize only some batteries 200(1), 200(2) and maintain the electric potential of other batteries 200(1), 200(2) so that the available electric potential is able to temporarily carry the required load and power pumps 205, 206 to restore the electric potential of neutralized batteries 200(1), 200(2).

Figure 5:
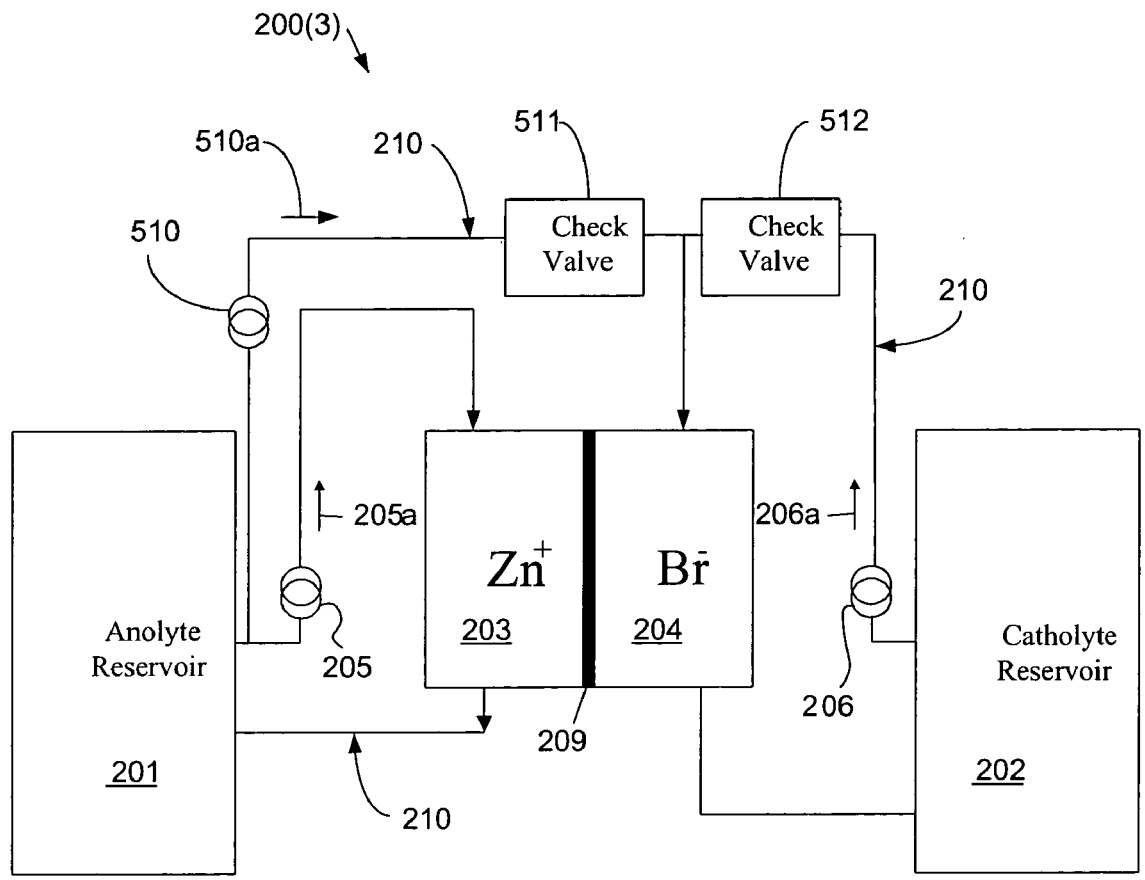
FIG. 5 schematically shows another flowing electrolyte battery with electric potential neutralization.

FIG. 5 shows an embodiment of a flowing electrolyte battery with electric potential neutralization 200(3); battery 200(3) includes a pump 510 and first and second check valves 511, 512 to selectively supply electrolyte from anolyte reservoir 201 to electrode 204. Pump 510 is sized such that, when turned on, it forces check valve 511 open and check valve 512 closed. As shown, pump 510 only pumps electrolyte from anolyte reservoir 201 in direction 510a to electrode 204, and check valves 511, 512 only permit fluid flow in one direction.

In an exemplary method of use, pump 510 is turned off under normal conditions. When pump 510 is turned off, pressure from pump 206 forces fluid through valve 512 and forces valve 511 closed. However, if pump 510 is energized, anolyte from anolyte reservoir 201 is forced through valve 511 and electrode 204, and valve 512 is forced closed. The electrical potential of battery 200(3) is thus brought to zero without removing the charge.

As shown in FIG. 5, electrolyte from electrode 204 may enter catholyte reservoir 202 regardless of whether the electrolyte is acolyte or catholyte. Since this will be done for only a short period of time, there will be (at most) only a small amount of anolyte delivered to catholyte reservoir 202. However, an overflow connector (not shown) may be included between the anolyte and catholyte reservoirs 201, 202 to prevent a respective reservoir from becoming over-full. The bromide rich electrolyte will thus sink to the bottom of the reservoir, and the top layer will be compatible with the anolyte. Therefore, overflow from the top of the reservoir will not force the bromide rich electrolyte into anolyte reservoir 201.

Figure 6:
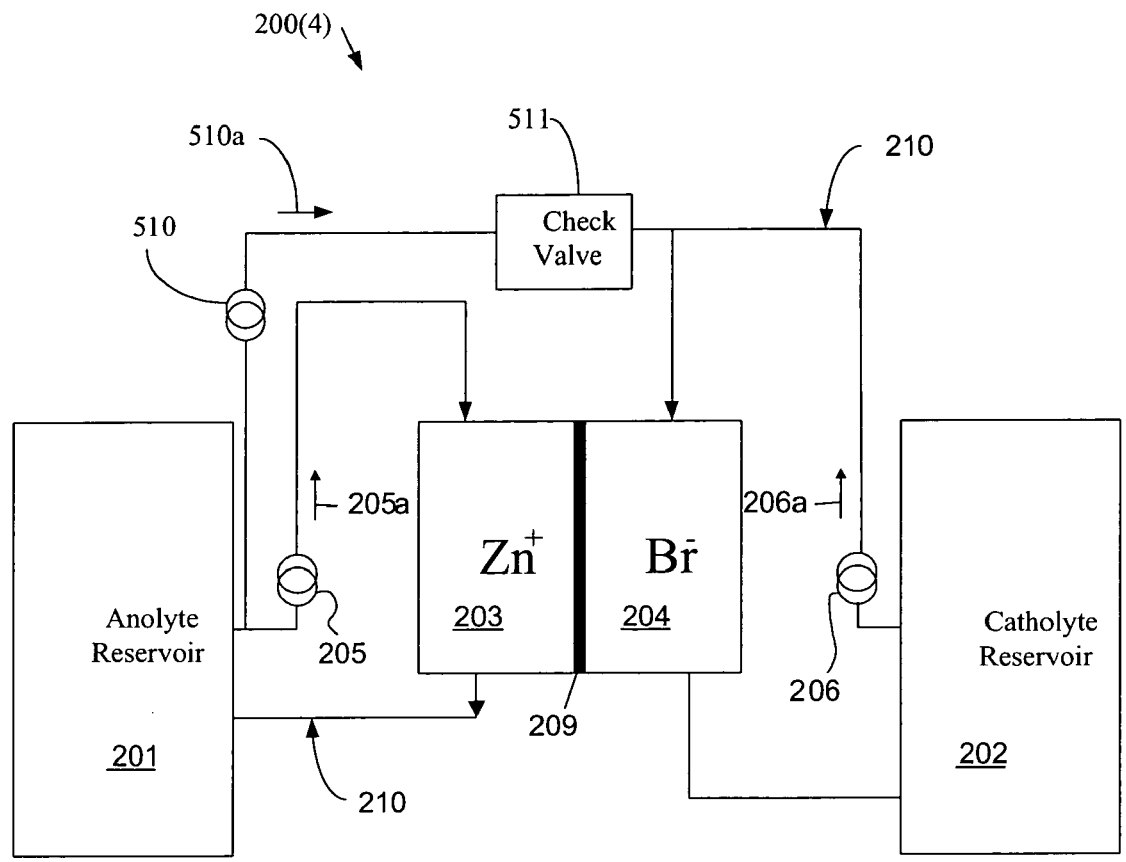
FIG. 6 schematically shows another flowing electrolyte battery with electric potential neutralization.

FIG. 6 shows an embodiment of a flowing electrolyte battery with electric potential neutralization 200(4) that may function substantially as described above in reference to FIG. 5, though without check valve 512. Although not shown, the embodiment described in FIG. 5 may also function without check valve 511 and check valve 512. In removing valve 511 and/or valve 512, piping and pumps 206, 510 may be configured and sized such that there is no cross-flow; catholyte from reservoir 202 may be selectively forced through electrode 204; and anolyte from reservoir 201 may be selectively forced through electrode 204.

Figure 7:
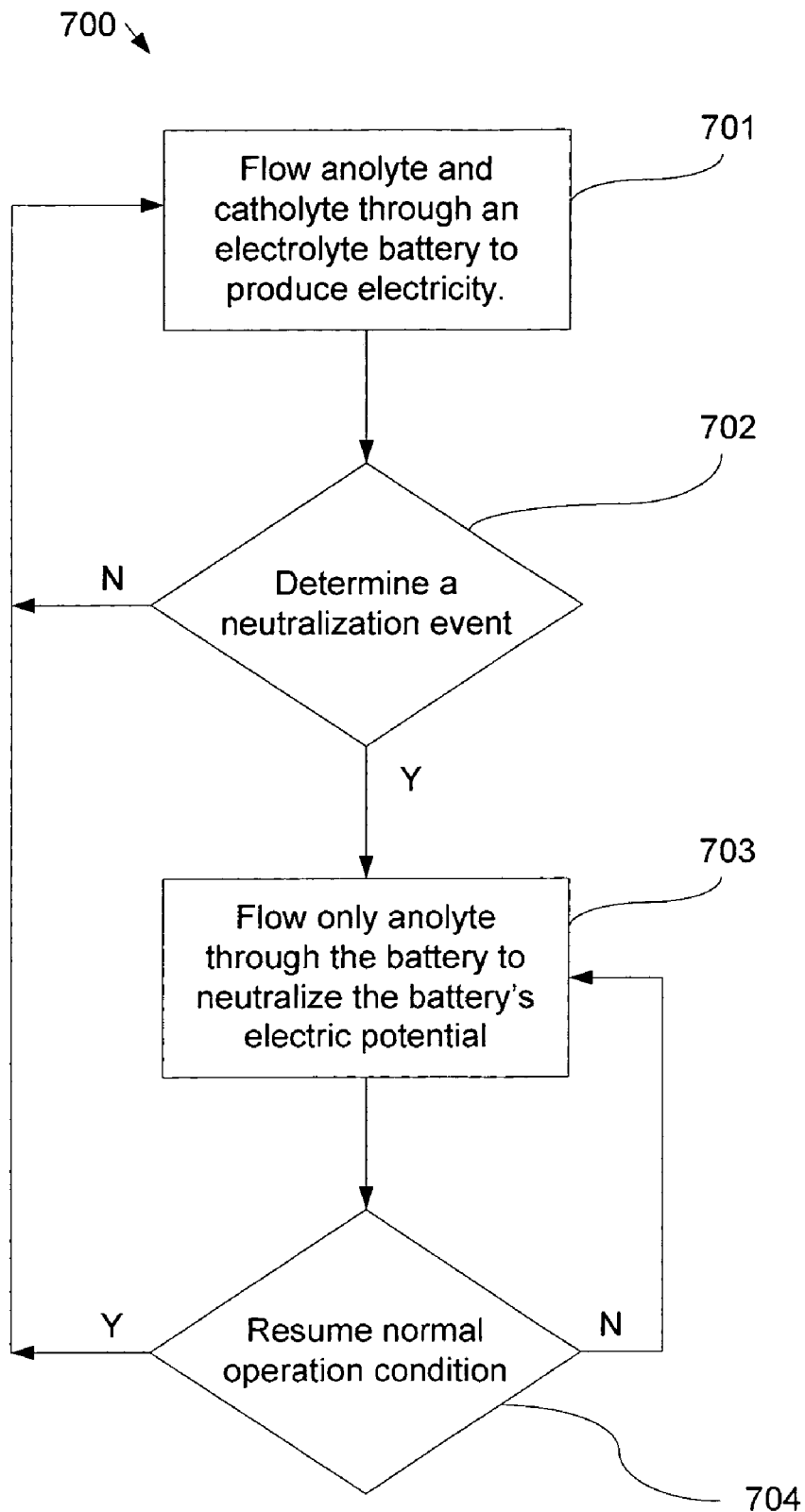
FIG. 7 is a flowchart illustrating a process of selectively neutralizing a flowing electrolyte battery chemically and subsequently restoring electric potential.

FIG. 7 shows a process 700 of selectively neutralizing a flowing electrolyte battery chemically and subsequently restoring its electric potential. In step 701, anolyte and catholyte are flowed through an electrolyte battery to produce electricity. In an example of step 701, pumps 205, 206 pump anolyte and catholyte through electrodes 203, 204, as shown in FIG. 2. In step 702, a neutralization condition is determined. In an example of step 702, as discussed in reference to FIG. 4, controller 401 detects an event (e.g., switch 411 is turned off by a user) and/or an abnormal condition (e.g., an abnormal pressure detected by pressure sensor 412; an abnormal voltage detected by voltmeter 413; an abnormal temperature detected by thermometer 414; and/or an indication of a leak by leak detector 415).

In step 703, only anolyte is flowed through the battery to neutralize the battery's electric potential. In an example of step 703, valves 207, 208 and pump 205 cooperate to introduce only anolyte through electrodes 203, 204, as shown in FIG. 2. If valve 208 is substantially as described in reference to FIG. 4, controller 401 sends a "neutralize" signal via interface conditioner 402 to cause valve 404a to be at a closed configuration and valve 404 to be at an open configuration. Additional examples are discussed above in reference to FIGS. 5 and 6, such as where pump 510 flows anolyte through electrodes 203, 204.

In step 704, a resume normal operation condition is determined in which electric potential is desired. In an example of step 704, controller 401 detects an event (e.g., switch 411 is turned on by a user) and/or a normalized condition is detected (e.g., a normal pressure detected by pressure sensor 412; a normal voltage detected by voltmeter 413; a normal temperature detected by thermometer 414; or another indication of normal conditions).

Figure 8:
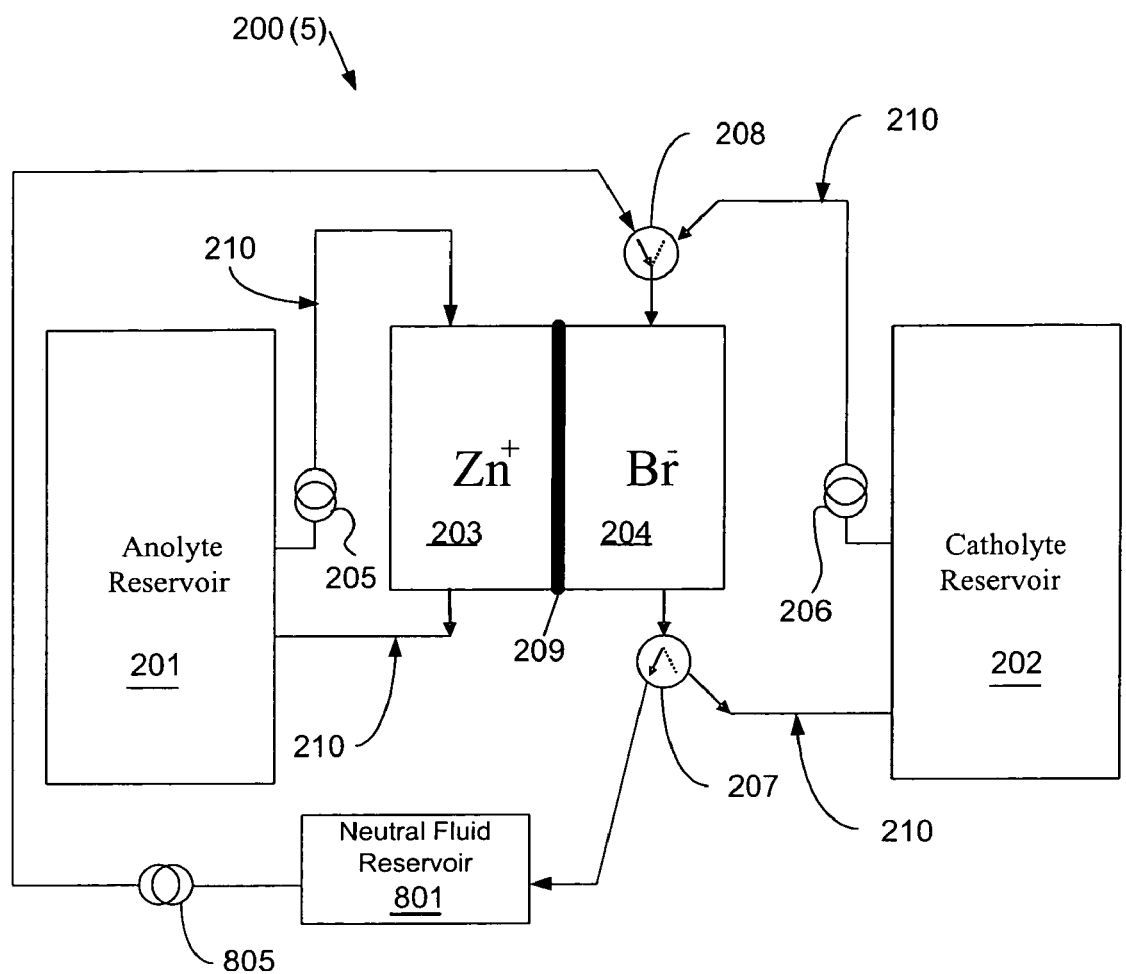
FIG. 8 schematically shows another flowing electrolyte battery with electric potential neutralization.

FIG. 8 shows an embodiment of a flowing electrolyte battery with electric potential neutralization 200(5) that includes a neutral fluid reservoir 801 in fluid communication with a pump 805 and valves 207, 208. An electrically neutral fluid (e.g., an electrolyte with reactant removed) may be contained in neutral fluid reservoir 801. In the case of a zinc bromine flowing electrolyte battery, an example of an electrically neutral fluid is electrolyte with bromine removed.

In normal operation, valve 208 only allows catholyte from catholyte reservoir 202 through catholyte electrode 204, and valve 207 only allows electrolyte passing through catholyte electrode 204 to enter catholyte reservoir 202. In a neutralized mode, however, valve 208 only allows neutral fluid from neutral fluid reservoir 801 through catholyte electrode 204, and valve 207 only allows electrolyte passing through catholyte electrode 204 to enter neutral fluid reservoir 801. Battery 200(5) is thus neutralized ("turned off") chemically when in the neutralized mode. Valves 207 and 208 are shown in the neutralized mode in FIG. 8.

Provided that there is no break in piping 210 and pumps 205, 206 are functional, the electric potential of battery 200(5) returns when valves 207 and 208 are returned to the normal position (i.e., so that catholyte flows through electrode 204). In other words, the electrical potential of battery 200(5) may be brought to zero without removing the charge, and original electric potential may be restored with no appreciable loss of stored energy.

Figure 9:
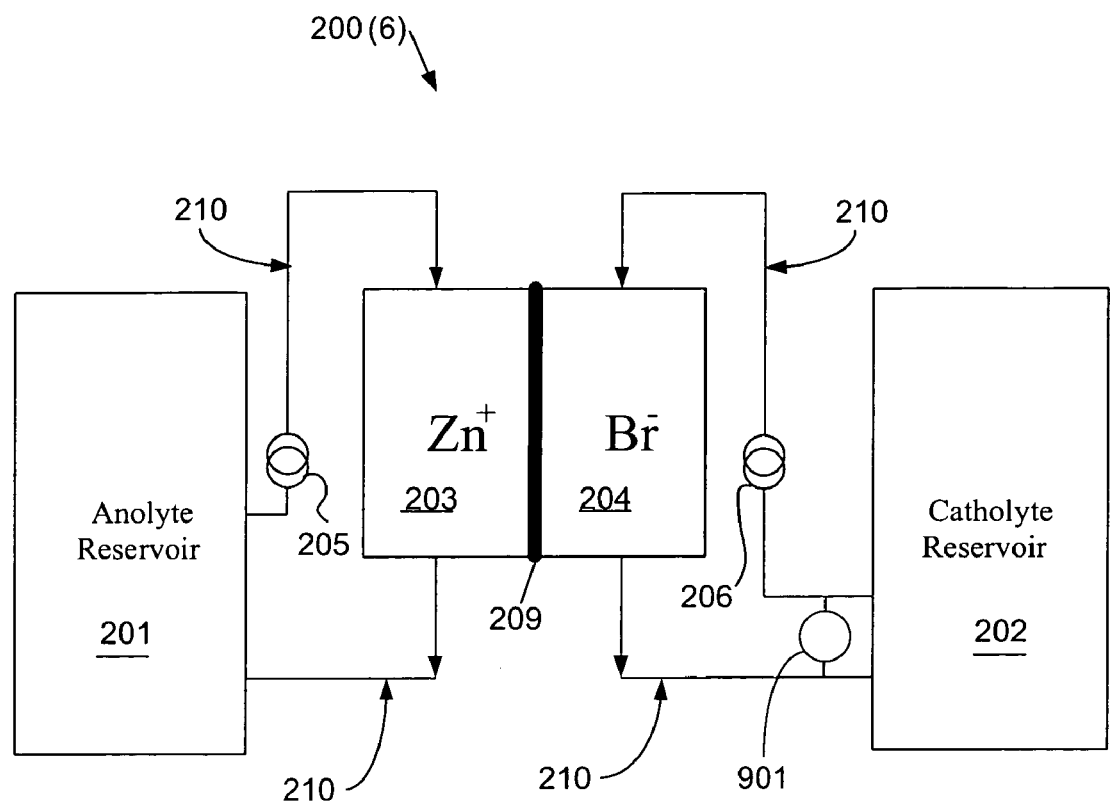
FIG. 9 schematically shows another flowing electrolyte battery with electric potential neutralization.

FIG. 9 shows an embodiment of a flowing electrolyte battery with electric potential neutralization 200(6) that includes a valve 901 that selectively allows electrolyte flowing out of electrode 204 to re-enter electrode 204 without first returning to catholyte reservoir 202. This allows reactants in the electrolyte to be used up (or to become "electrically neutral") with no appreciable loss of energy, since the reactants are not replenished. In this way, electrode 204 and battery 200(6) become electrically neutral in a short period of time without an appreciable loss of stored energy.

Figure 10:
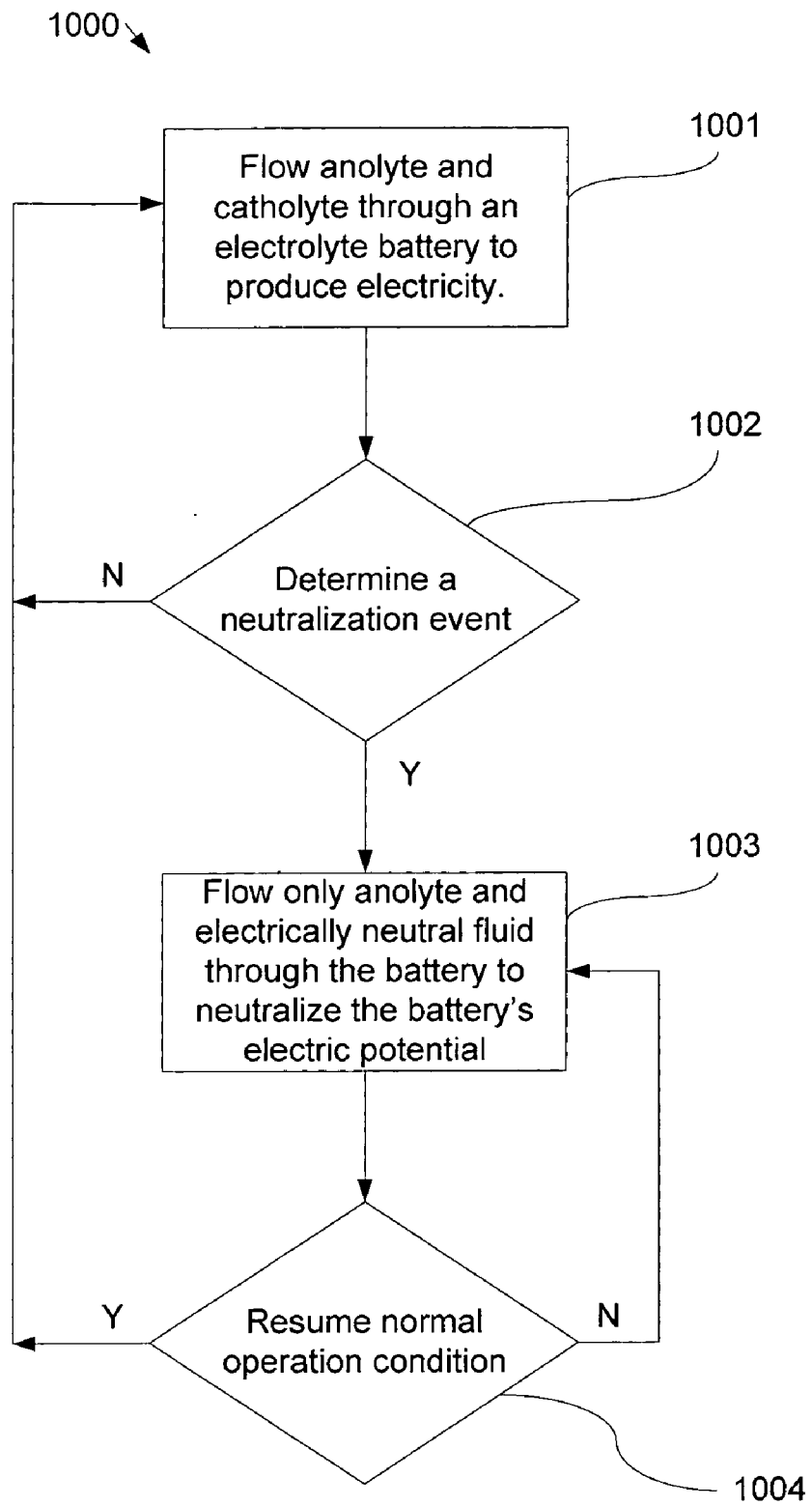
FIG. 10 is a flowchart illustrating another process of selectively neutralizing a flowing electrolyte battery chemically and subsequently restoring electric potential.

FIG. 10 shows a process 1000 of selectively neutralizing a flowing electrolyte battery chemically and subsequently restoring its electric potential. In step 1001, anolyte and catholyte are flowed through an electrolyte battery to produce electricity. In an example of step 1001, pumps 205, 206 pump anolyte and catholyte through electrodes 203, 204, as shown in FIG. 8. In step 1002, a neutralization condition is determined. In an example of step 1002, as discussed in reference to FIG. 4, controller 401 detects an event (e.g., switch 411 is turned off by a user) and/or an abnormal condition (e.g., an abnormal pressure detected by pressure sensor 412; an abnormal voltage detected by voltmeter 413; an abnormal temperature detected by thermometer 414; and/or an indication of a leak by leak detector 415).

In step 1003, only anolyte and an electrically neutral fluid is flowed through the battery to neutralize the battery's electric potential. In an example of step 1003, valves 207, 208 and pump 805 cooperate to introduce only electrically neutral fluid through electrode 204, as shown in FIG. 8. An additional example is discussed above in reference to FIG. 9, such as where valve 901 causes electrolyte flowing out of electrode 204 to re-enter electrode 204 without first returning to catholyte reservoir 202.

In step 1004, a resume normal operation condition is determined in which electric potential is desired. In an example of step 1004, controller 401 detects an event (e.g., switch 411 is turned on by a user) and/or a normalized condition is detected (e.g., a normal pressure detected by pressure sensor 412; a normal voltage detected by voltmeter 413; a normal temperature detected by thermometer 414; or another indication of normal conditions).

Those skilled in the art appreciate that variations from the specified embodiments disclosed above are contemplated herein and that any described test results are not limiting. The description should not be restricted to the above embodiments or test results, but should be measured by the following claims.

What is claimed is:

1. A flowing electrolyte battery, comprising:
   first and second electrodes separated by a membrane; and
   at least one flow valve in fluid communication with the second electrode;
   the battery including a normal operating mode and a neutralized operating mode, the neutralized operating mode triggered in response to a detected neutralization event;
   wherein anolyte flows through the first electrode during both the normal and the neutralized operating modes;
   wherein in the normal operating mode, the at least one flow valve structurally allows catholyte to flow through the second electrode while preventing anolyte from flowing through the second electrode;
   wherein in the neutralized operating mode, the at least one flow valve structurally allows anolyte to flow through the second electrode while preventing catholyte from flowing through the second electrode;
   wherein the neutralization event is selected from the group consisting of abnormal battery voltage, abnormal battery temperature, abnormal battery pressure, battery leakage, a period of non-use of the battery, and a fire in an environment outside of the battery; and
   wherein the battery further comprises one or more sensors in data communication with a controller for detecting an abnormal condition representing the detected neutralization event.

2. The battery of claim 1, further comprising a pump in fluid communication with the at least one flow valve to force catholyte from a catholyte reservoir to the second electrode during the normal operating mode.

3. The battery of claim 1, further comprising a pump in fluid communication with the first electrode and the at least one flow valve, the pump forcing anolyte from an anolyte reservoir to the first electrode during the normal operating mode, the pump forcing anolyte from the anolyte reservoir to the first and second electrodes during the neutralized operating mode.

4. The battery of claim 1, further comprising:
   an anolyte reservoir for housing the anolyte;
   a first pump in fluid communication with the anolyte reservoir, the first electrode, and the at least one flow valve, the first pump forcing anolyte from the anolyte reservoir to the first electrode during the normal operating mode, the first pump forcing anolyte from the anolyte reservoir to the first and second electrodes during the neutralized operating mode;
   a catholyte reservoir for housing the catholyte;
   a second pump in fluid communication with the catholyte reservoir and the at least one flow valve, the second pump forcing catholyte from the catholyte reservoir to the second electrode during the normal operating mode; and
   piping for connecting the first electrode to the anolyte reservoir such that the anolyte flows from the first electrode to the anolyte reservoir, the piping connecting the second electrode to the catholyte reservoir such that the catholyte flows from the second electrode to the catholyte reservoir, and the piping connecting the second electrode to the anolyte reservoir such that anolyte that has flowed through the second electrode continues to flow to the anolyte reservoir.

5. The battery of claim 1, wherein the at least one flow valve comprises:
   a controller in data communication with an interface conditioner;
   first and second flow valves; and
   first and second actuators in data communication with the interface conditioner, the first actuator controlling said first flow valve for selectively allowing the anolyte to reach the second electrode, the second actuator controlling said second flow valve for selectively allowing the catholyte to reach the second electrode.

6. The battery of claim 5, wherein the interface conditioner communicates with the first and second actuators by supplying the first and second actuators with electrical signals.

7. The battery of claim 1, further comprising a user-activated switch in communication with a controller allowing a user to initiate the detected neutralization event.

8. The battery of claim 1, wherein:

the at least one flow valve comprises a first and a second flow valve;

the first flow valve selectively permits the flow of one of anolyte and catholyte to the second electrode; and the second flow valve selectively permits the flow of fluid from the second electrode to one of an anolyte reservoir and a catholyte reservoir.

9. The battery of claim 1, wherein the at least one flow valve is a single valve in fluid communication with an inlet to the second electrode.

10. The battery of claim 1, wherein:

the at least one flow valve is a single pair of three way valves;

a first of the single pair of three way valves is in fluid communication with an inlet to the second electrode; and a second of the single pair of three way valves is in fluid communication with an outlet from the second electrode.

* * * * *